June 14, 1927.
C. I. TENNEY ET AL
1,632,457
GAS PURIFYING APPARATUS
Filed Aug. 28, 1925   3 Sheets-Sheet 2
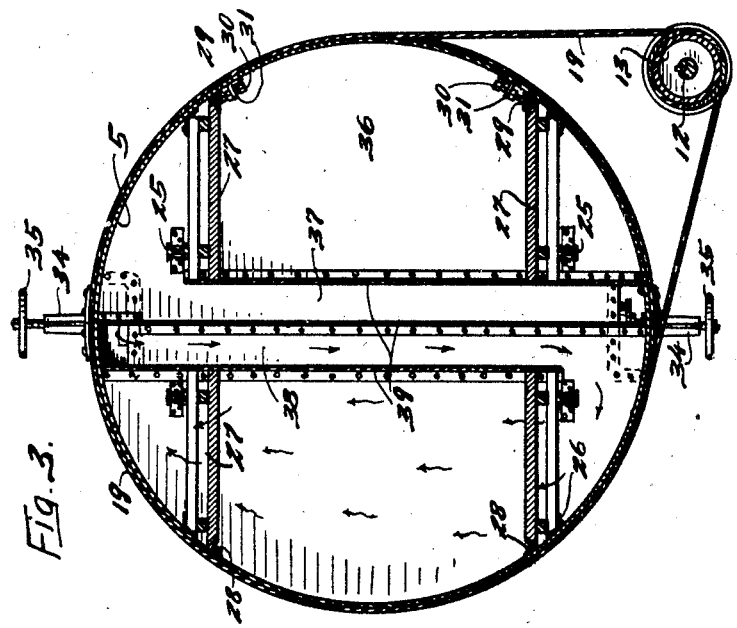
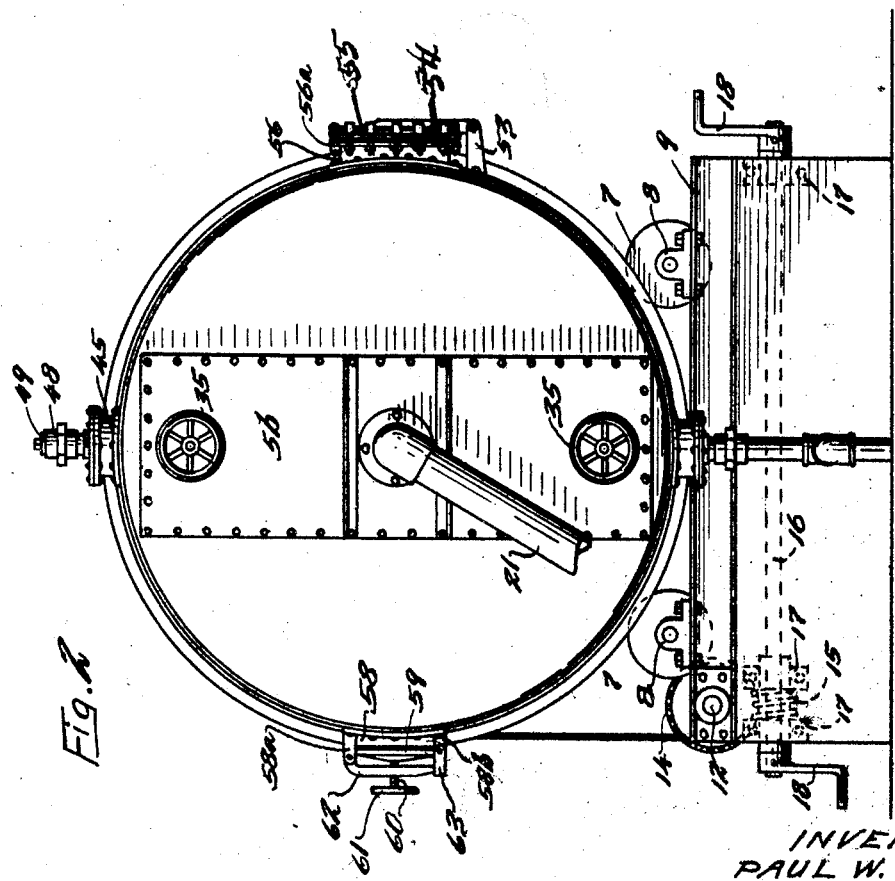
INVENTORS.
PAUL W. THAYER
CHARLES I. TENNEY
BY THEIR ATTORNEYS.

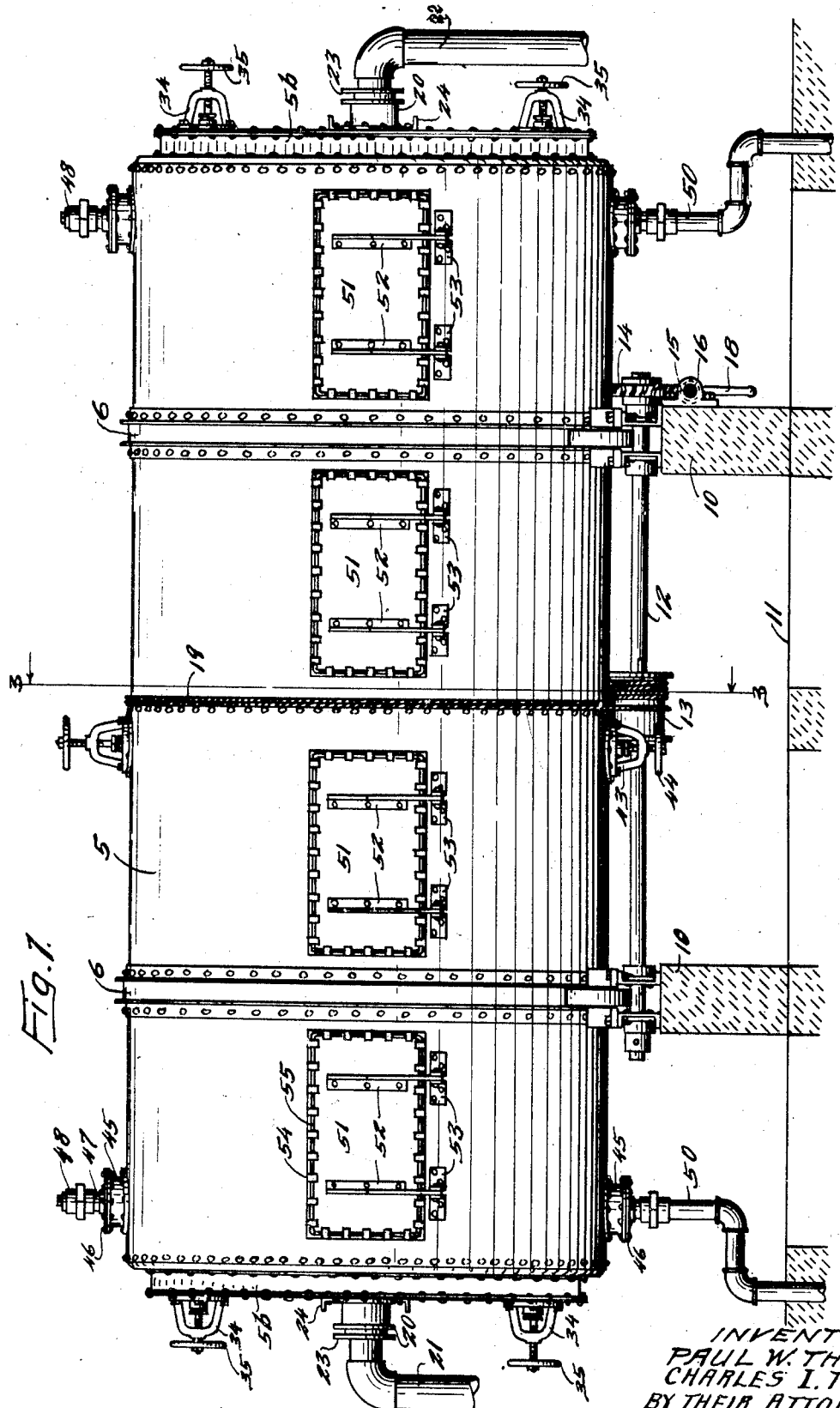

June 14, 1927.

C. I. TENNEY ET AL 1,632,457

GAS PURIFYING APPARATUS

Filed Aug. 28, 1925

INVENTORS.
PAUL W. THAYER.
CHARLES I. TENNEY.
BY THEIR ATTORNEYS.

Patented June 14, 1927.

1,632,457

UNITED STATES PATENT OFFICE.

CHARLES I. TENNEY, OF AMES, IOWA, AND PAUL W. THAYER, OF MINNEAPOLIS, MINNESOTA; SAID THAYER ASSIGNOR TO AMERICAN GAS CONSTRUCTION COMPANY, OF NEWTON, IOWA, A CORPORATION OF IOWA.

GAS-PURIFYING APPARATUS.

Application filed August 28, 1925. Serial No. 53,170.

This invention relates to a gas purifying apparatus, such as used in treating artificial heating and illuminating gas. It is the practice in modern gas making to pass such gas through certain materials, such as iron or steel shavings mixed with wooden shavings, in order to free the gas from certain impurities, such as the condensed hydrocarbons and other liquid principally in the form of tar.

It has hitherto been the practice to have this material in a stationary container and to pass the gas in one direction therethrough. This practice has quite a few serious objections and the purifying or filtering material is not efficiently used.

It is an object of this invention to provide such a purifying apparatus comprising a revoluble member in which the purifying material is contained, which members can be rotated so that the layer of material can be shaken up and efficiently used.

It is a further object of the invention to provide such an apparatus comprising a revoluble member having spaced perforated trays or partitions therein between which the material is disposed, together with valve controlled passages leading from the outer sides of said trays through inlet and outlet conduits, whereby the gas can always be passed upward through the purifying material.

It is a further object of the invention to provide such an apparatus in the form of a revoluble cylinder supported on rollers whereby it can be rotated thereon, said cylinder having axially disposed inlet and outlet conduits at its opposite ends, respectively, and spaced perforated trays extending across said cylinder parallel to its axis, and valve controlled passages leading from the outer side of said trays to said inlet and outlet conduits, said cylinder preferably being divided between its ends by a transverse partition adjacent which are valve controlled passages leading to the outer side of said trays.

It is still another object of the invention to provide such an apparatus as set forth in the preceding paragraph, having a series of outwardly swinging doors at one side thereof, through which the material may be charged into said apparatus and discharged therefrom.

These and other objects and advantages of the invention will be fully set forth in the following description made in connection with the accompanying drawings in which like reference characters refer to the same parts throughout the different views, and in which, Fig. 1 is a view in side elevation of the device;

Fig. 2 is a view in end elevation thereof;

Fig. 3 is a view in vertical section taken on the line 3—3 of Fig. 1, as indicated by the arrows.

Figure 4:
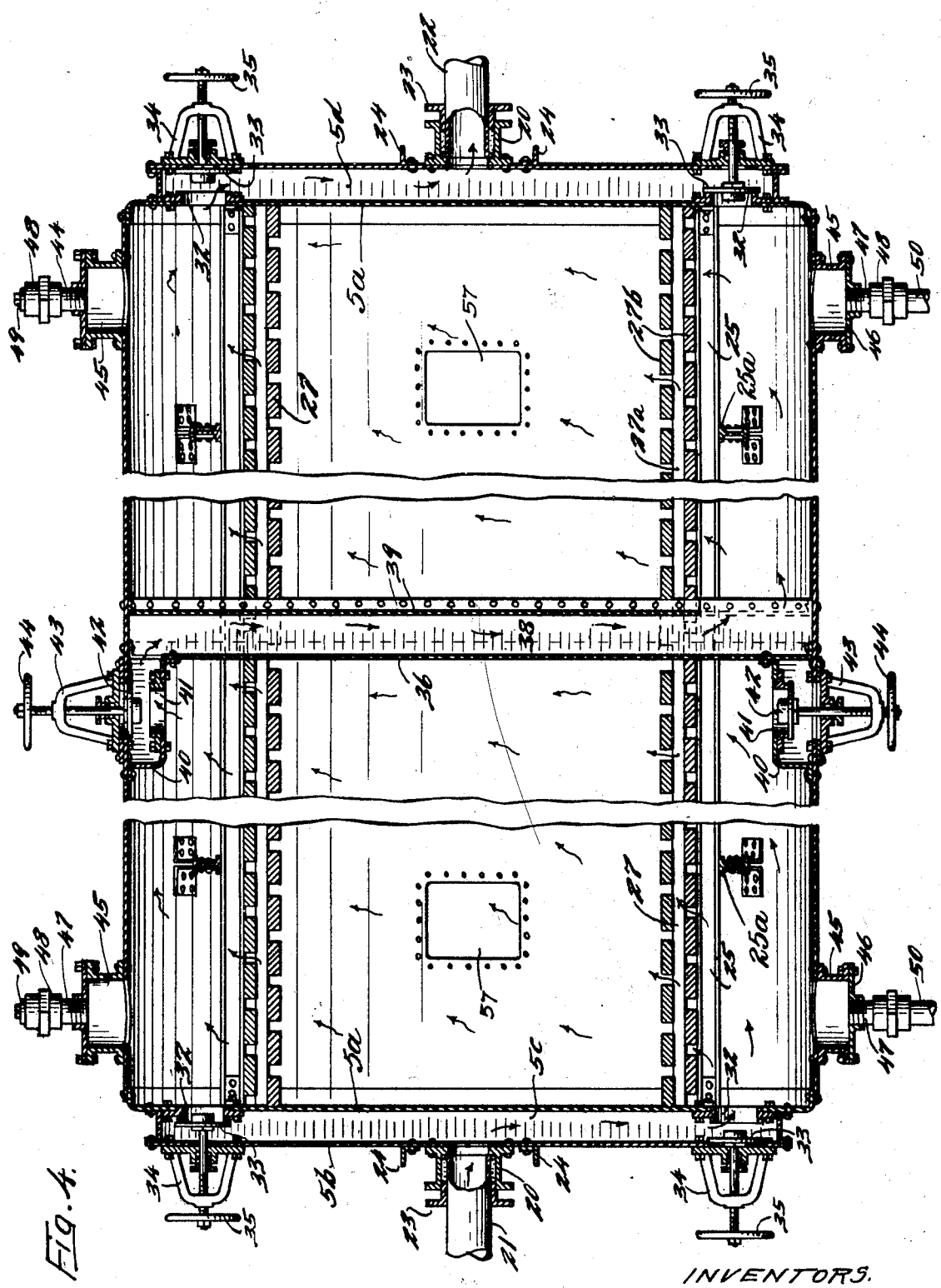
Fig. 4 is a central longitudinal vertical section, a portion of the device being broken away.

Referring to the drawings, a casing 5 is provided, and while this casing may have various forms, in the embodiment of the invention illustrated, the same is shown as cylindrical. Said casing is provided on its outer side with circumferential channels 6 formed by angle irons secured thereto and said casing rests upon laterally spaced rollers 7, said rollers being adapted to roll in the channels 6. The rollers 7 have trunnions supported in bearings 8 at each side thereof, which bearings are bolted to the frame structure comprising channel bars 9, which bars rest upon suitable piers or foundations 10 rising from the floor line 11. A shaft 12 is supported in suitable bearings carried by the channel bars 9 adjacent one end of said bars and said shaft has secured thereto a drum 13. Said shaft 12 also carries a worm wheel gear 14 adjacent one end adapted to be engaged and turned by a worm gear 15 carried on a shaft 16 extending through bearings 17 secured to one of the piers 10, and said shaft has secured to its ends operating cranks 18. A cable 19 extends about the cylinder 5 adjacent the center thereof and has its ends secured to the drum 13 and extending thereabout several times. It will be seen that by turning the cranks 18 shaft 12 will be driven through the gears 14 and 15 and drum 13 will be turned. The cable 19 will thus rotate the cylinder 5 on the rollers 7 through its frictional engagement with said casing. The casing 5 has closed end walls 5ª and an extension casing 5ᵇ is secured thereto at each end. A cylindrical flanged head 20 is secured to the outer side of the casings 5ᵇ with which communicates an inlet conduit 21 and an outlet conduit 22, respectively. The conduits 21 and 22 each have an outwardly directed flange at their inner ends seating against an inwardly extending flange on the members 20 and said conduits are surrounded by suitable packing material held in place and compressed by glands 23 which will be held in place by the usual bolts (not shown). The casing 5 and the casings 5$^b$ are thus rotatable relatively to the conduits 21 and 22. The ends of casings 5$^b$ are stiffened by suitable transverse angle bars 24. Spaced supports illustrated as I-beams 25 extend longitudinally of the interior of casing 5 somewhat adjacent opposite sides thereof and are secured to the ends 5$^a$ of said casing. Lateral supports shown as angle plates 26 are secured to the sides of the casing 5 in line with the I-beams 25 and said beams 25 and plates 26 form the supports for a pair of substantially parallel perforated trays or partitions 27 extending across the casing 5 substantially in line of a chord of the circular cross section thereof. The trays or partitions 27 are formed by longitudinally extending spaced bars 27$^a$ and transversely extending spaced slats or supports 27$^b$ at each side thereof, the spaces between the slats 27$^b$ at each side of the bars 27$^a$ being staggered. The inner slats 27$^b$ have their end edges beveled and adapted to fit against the sides of angle bars 28 secured at one side of the casing 5. The other ends of said inner slats 27$^b$ are also beveled and adapted to have seated thereagainst one side of adjustable angle bars 29 engaged by headed bolts 30 threaded into angle bars 31 also secured to the side of casing 5 a short distance from the bars 29. Transverse beams 25$^a$ secured to the sides of casing 5 support beams 25 adjacent the centers thereof. It will be seen that the auxiliary casing 5$^b$ forms channels or passages 5$^c$ and 5$^d$, respectively, extending from the inlet conduit 21 and from the outlet conduit 22. The end walls 5$^a$ are provided with openings adjacent the ends of channels 5$^c$ and 5$^d$ and flanged valve rings 32 are disposed in these openings and bolted to the end walls 5$^a$. Co-operating with the valve rings 32 are the plate valves 33 secured to stems threaded into brackets 34 bolted to the outside of auxiliary casing 5$^b$ and equipped with operating hand wheels 35. Said stems also extend through suitable stuffing boxes in brackets 34 which latter cover openings in the ends of the auxiliary casing 5$^b$. The casing 5 is shown as divided intermediate its ends by a partition 36 and passages 37 and 38 are formed by spaced plates 39 suitably secured to said partition. Adjacent the partition 36 at the opposite sides of casing 5 are casings 40 secured to partition 36 and the inner sides of casing 5, which casings 40 are provided with apertures extending into the casing 5 and at the outer sides of the partitions 27, which openings are provided with valve rings 41 with which co-operate the valve plates 42 carried on stems threaded into brackets 43 secured to the outer side of casing 5, said stems being provided with hand wheels 44 and extending through suitable stuffing boxes in the brackets 43. The valve casing 40 at one side of the partition communicates at one end with one passage 38 and said passage is open at its other end to the outer side of the partition 27. The other casing 40 communicates at one end with the passage 37 and said passage is open at its other end to the outer side of the other partition 27, as shown in Fig. 3.

The casing 5 has flanged cylindrical casings 45 secured thereto at opposite sides and adjacent each end and surrounding openings thereinto. The casings 45 are provided with covers 46 having central hubs into which pipes 47 are threaded, which pipes are provided with suitable couplings 48 which may be provided with plugs 49 or coupled to pipes 50 extending downward into the floor and forming drain pipes. The casing 5 is also provided at one side with doors 51, which doors have transverse bars 52 secured thereto and extending transversely thereof and projecting at one side of the doors to form hinges pivotally connected to brackets 53 secured to the side of casing 5. While any suitable closing means may be used with the doors, in the embodiment of the invention illustrated, a plurality of bolts 54 are provided for each door extending therethrough adjacent its edge and having a head with a transverse opening, thus forming an eyelet through which heads extends a rod 55. The bolts 54 extend through slots in the edge of a plate or flange 56$^a$ projecting from casing 56 having a flange riveted to the outer side of casing 5 and surrounding the door opening thereinto. The bolts 54 are provided with nuts at the inner side of flange 56$^a$.

Diametrically opposite doors 51, the casing 5 has openings 57 surrounded by casings 58 riveted to casing 5 with which co-operate closing plates 59 carried on screws 60 equipped with hand wheels 61 and threaded into swinging bars 62. The bars 62 are hinged to brackets 58$^a$ projecting at one side of casing 58, and have their free ends engaged by a swinging bail 63 also hinged to brackets 58$^b$ on casing 58.

In operation, the apparatus mounted as shown in Fig. 1, will have the inlet conduit 21 connected to the gas generator and the outlet conduit 22 connected to the storage apparatus. The filtering or purifying material, such as iron or steel shavings, will be charged into the casing 5 between partitions 27 through the doors 51. The purifier is, in practice, about eleven feet in diameter and the material is usually charged in at the top through trap doors in the floor above that on which the apparatus is disposed, the casing 5 being rotated to have the doors upward for this purpose. The material being in place, and doors 51 closed, the casing will be rotated to bring the partitions 27 into substantially horizontal position and the gas will be turned into the inlet conduit 21. The gas passes into passage 5ᶜ and the valves 33, at the top of said passage, will be closed and the valve 33 at the bottom of said passage opened. The gas will thus pass down below the lower tray 27 and will pass upward through the space between the slats 27ᵇ through the purifying material, through the upper tray 27 and into the valve casing 40 at the top, the valve 42 at this time being open. The gas passes downwardly through passage 38 and from the bottom of this passage below the tray 27 at the other side of partition 36. The gas now rises again through the material and into the space above the upper tray 27. The valve 33 at the top of passage 5ᵈ is opened and the valve 33 at the bottom of said passage is closed. The gas thus must pass out through the outlet conduit 22 and the same will be conducted to the desired place. After the gas has run through the material for a certain time, the lower part of the layer of material between trays 27 will be largely used up and clogged up with impurities. The purifying material also tends to settle and pack into a hard mass. After the material thus becomes inefficient to a certain degree, the pipes 50 will be disconnected by turning couplings 48 and casing 5 will be rotated through 180 degrees to bring the upper tray 27 into the lower position so that the lower tray 27 will now be on top. The cylinder is rotated, as previously described, by turning the cranks 18. The rotation of casing 5 jolts and shakes up the purifying material so that the same is effectively loosened and improved. When the casing has been rotated to its new position the pipes 50 will again be connected to the pipes 47 which are now projecting downwardly and the upwardly projecting pipes 47 will be closed with the plugs 49. The valves 33 will now be manipulated so that the upper valve at the inlet end, is closed and the lower valve at the inlet end opened and so that the upper valve at the outlet end in passage 5ᵈ is opened and the lower valve in said passage closed. The upper valve 42 will be open as before and the lower valve closed. The gas will now again be run through the apparatus taking the same path as before and passing upwardly through the material at each side of partition 36. While the direction of the gas is the same it will, of course, be understood that it now passes through passage 37 instead of passage 38 at the center of the casing 5. The top of the purifying material which was least affected by the passage of the gas is now at the bottom where it will first come in contact with unpurified gas. Both sides of the layer of filtering material are thus successfully brought into contact with the unpurified gas and the material is thus efficiently used. There is a tendency for the gas to follow along the walls of the purifier. If, however, in the present apparatus, the gas should follow along the sides of the casing 5, it will take a longer path than in going directly vertically therethrough, so that a good purifying effect will be obtained nevertheless. After the gas has been run through the material until the material can no longer efficiently be used the casing 5 will be again disconnected from pipes 50 and rotated substantially ninety degrees to bring the doors 51 at the lower side thereof. The doors will be open by loosening the nuts on bolts 54 and swinging the bolts away from the plate 56ᵃ. The doors will then hang down in vertical position. It will be noted that the bolts 54 are carried by the door and are thus, to a great extent, kept out of the way of the material discharging through the doors so that they will not become covered with tar, oil and dirt from the inside of casing 5. The doors being open, the material between plates 27 can be discharged by poking the same with rods projected upwardly through the door openings and downwardly through openings 57. It will be noted that the walls of casing 5 converge downwardly toward the door openings so that the material naturally moves down and out of the openings, the material dropping downwardly through openings in the floor 11 into suitable discharge receptacles or conveyors. The device is now ready to be re-charged with purifying material. It will be understood that the tar and other material dripping from the purifying material will be drained off through pipes 50.

The parts of the trays 27 can be installed and removed through the doors 51 and it will be noted that the slats 27ᵇ can be placed in position with one end under the angle bars 26 and 28 and the other end then tightened or clamped into position by the bolts 30. Convenient means is thus provided for placing and clamping the trays in position.

From the above description it is seen that applicants have provided a very simple and highly efficient gas purifying apparatus. The device can be easily manipulated for filling and discharging and can be rotated to different positions so that the gas is passed through the purifying material from both sides thereof. The purifying material is thus efficiently and completely used. The device is easily and quickly manipulated in the various operations. The device has been amply demonstrated in actual practice and found to be very successful and efficient.

It will, of course, be understood, that various changes may be made in the form, details, arrangement and proportions of the parts without departing from the scope of applicants' invention, which, generally stated, consists in a device capable of carrying out the objects above set forth, in the novel parts and combinations of parts disclosed and defined in the appended claims.

What is claimed is:

1. A gas purifying apparatus having in combination, a cylindrical casing, trays extending across a chord of said casing, said trays comprising spaced series of spaced slats adapted to support gas purifying material, the openings between adjacent slats in one series being staggered with the spaces between adjacent slats in the other series and means for rotating said casing to reverse the position of said purifying material.

2. A gas purifying apparatus having in combination, a cylindrical casing, spaced trays extending across said casing substantially parallel with the axis thereof and adapted to support gas purifying material therebetween, said trays comprising spaced apertured substantially parallel plates, the apertures in said plates being staggered and means for turning said casing about said axis for reversing the position of said purifying material so that the gas passes reversely therethrough.

3. A gas purifying apparatus having in combination, a casing, trays extending across the same, said trays comprising spaced apertured substantially parallel plates, a transverse partition intermediate the ends of said casing, passages adjacent said partition leading from the outer side of one tray at one side of said partition to the outer side of the other tray at the other side of said partition, and valves for controlling said passages.

4. A gas purifying apparatus having in combination, a cylindrical casing for supporting gas purifying material, trays extending across said casing, supports on the wall of said casing on which said trays rest, means for clamping said trays on said supports and means for rotating said casing to reverse the position of and the flow of gas through said purifying material.

5. A gas purifying apparatus having in combination, a frame, spaced rollers carried by said frame, a cylindrical casing supported on said rollers, means for rotating said casing, means in said casing for supporting purifying material, and means for passing gas through said casing and said purifying material.

6. A gas purifying apparatus having in combination, a rotatable cylindrical casing, a support for said casing permitting rotation of said casing, spaced parallel trays in said casing extending across the same, filling and discharge outwardly opening doors disposed at one side of said casing between said trays, whereby the walls of said casing slope downwardly toward said doors when said casing is turned with said doors downwardly disposed.

7. A gas purifying apparatus having in combination, a rotatable casing, spaced perforated trays extending across said casing between which purifying material is held, an inlet conduit for said casing adapted to conduct gas to the outer side of one of said trays adjacent one end of said casing and an outlet conduit for said casing leading from the outer side of the other of said trays adjacent the other end of said casing whereby said casing can be rotated and the material between said trays agitated.

8. A gas purifying apparatus having in combination, a rotatable casing, spaced perforated trays extending across said casing between which purifying material is held, an inlet conduit for said casing adapted to conduct gas to the outer side of said trays, valve means for controlling the passage of gas to the outer sides of said trays, an outlet conduit for said casing leading from the outer sides of said trays, valve means controlling the passage of gas from the outer sides of said trays, whereby said casing can be rotated and by manipulation of said valves said gas can always pass upward through said material.

9. A gas purifying apparatus having in combination, a rotatable cylindrical casing, spaced perforated trays extending across said casing between which purifying material is held, an inlet conduit disposed at one end of said casing, passages at said end of said casing leading from said conduit to the outer sides of said trays, valves controlling said passages, an outlet conduit disposed axially of said casing at the other end thereof, passages leading from the outer sides of said trays at said latter end to said outlet conduit, valves controlling said latter passages, and means for rotating said casing whereby gas may pass into said casing and upward through said material and said casing can be rotated substantially 180 degrees to shake up said material.

10. A gas purifying apparatus having in combination, a rotatable casing, spaced perforated trays extending across said casing between which purifying material is held, an inlet conduit for said casing adapted to conduct gas to the outer side of one of said trays adjacent one end of said casing, and an outlet conduit for said casing leading from the outer side of the other of said trays whereby said casing can be rotated and the material between said trays agitated.

11. A gas purifying apparatus having in combination, a rotatable casing, spaced perforated trays extending across said casing between which purifying material is held, an inlet conduit for said casing adapted to conduct gas to the outer side of one of said trays adjacent one end of said casing, an outlet conduit for said casing leading from the outer side of the other of said trays, means for rotating said casing through substantially 180 degrees, and means for directing said gas upwardly through said material in either position of said casing.

12. A gas purifying apparatus having in combination, a casing, trays extending across said casing, said trays being vertically spaced for holding purifying material therebetween and to permit the passage of gas therethrough, means for rotating said casing to reverse the positions of said trays and material, and means for passing gas into said casing through said material and out of said casing.

In testimony whereof we affix our signatures.

CHARLES I. TENNEY.
PAUL W. THAYER.